Oct. 16, 1956 M. CAMRAS 2,767,253

COMPENSATING DEVICE FOR A MAGNETIC RECORDING-REPRODUCING HEAD

Filed Feb. 1, 1952

Inventor
Marvin Camras
by Hill, Sherman, Meroni, Gross & Simpson
Attys

United States Patent Office 2,767,253
Patented Oct. 16, 1956

2,767,253

COMPENSATING DEVICE FOR A MAGNETIC RECORDING-REPRODUCING HEAD

Marvin Camras, Chicago, Ill., assignor to Armour Research Foundation of Illinois Institute of Technology, Chicago, Ill., a corporation of Illinois Application February 1, 1952, Serial No. 269,508

22 Claims. (Cl. 179—100.2)

The present invention is directed to a compensating device for an electromagnetic transducer head used in magnetic recording-reproducing assemblies.

Considerable difficulty has often been experienced in magnetic recording and reproducing apparatus due to hum produced during the play-back operation, the hum being caused by stray magnetic fields in the vicinity of the head.

Various efforts have been made in the past to reduce or eliminate this hum, primarily by shielding the head against the stray fields. Theoretically, it is possible to balance out the hum by using a coil and head arrangement in which the stray field induces hum voltages which are in opposition to each other without substantially interfering with the signal voltage. However, stray fields are not always homogeneous, that is, they do not affect different portions of the head to the same degree and for that reason the ordinary hum-bucking arrangements have not been able to achieve the theoretical balance. Consequently, hum still remains an objectionable feature in many types of reproducing apparatus.

Reduction in stray field pick-up can usually be made by reorienting the head itself, but this is usually impractical because the head must be located in a definite position in order to contact the record properly.

One of the objects of the present invention is to provide an improved electromagnetic transducer head assembly having a compensating device thereon for eliminating substantially hum produced by stray fields, whether homogeneous or non-homogeneous.

Another object of the present invention is to provide an adjustable compensating device for a magnetic recording-reproducing head which is adjustable to achieve a reorientation of stray magnetic fields appearing in the vicinity of the head.

Still another object of the present invention is to provide an improved hum-bucking arrangement for single coil electromagnetic transducer heads.

The novel features which I believe to be characteristic in my invention are set forth with particularly in the appended claims. My invention itself, however, both as to its manner of construction, method of operation, together with further objects and advantages may best be understood by reference to the following description taken in connection with the accompanying drawing, in which:

Figures 1, 2:
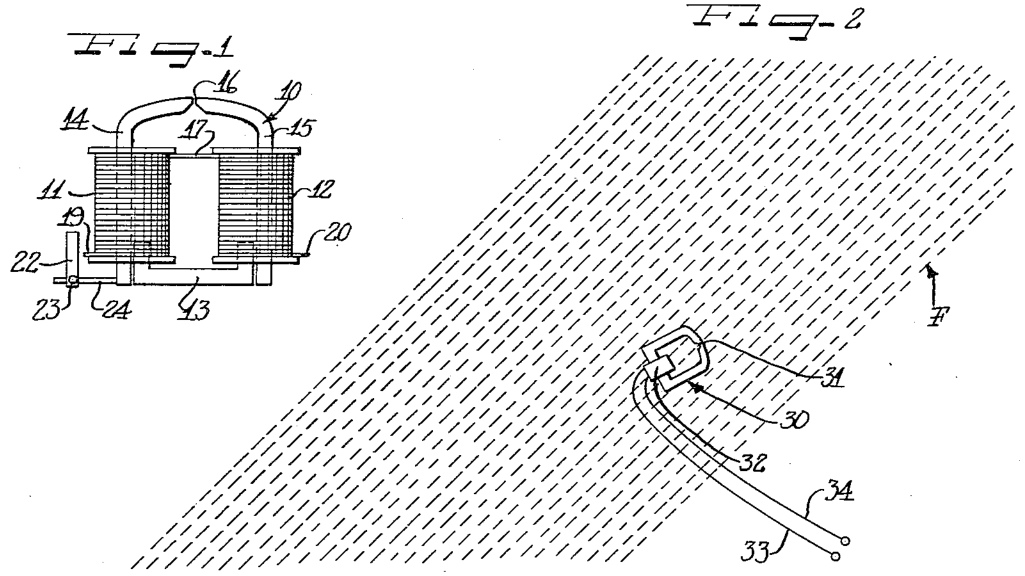
Figure 1 is a view in elevation of an electromagnetic transducer head and compensating device of the type described in the present invention.
Figure 2 is a diagrammatic view of a single coil head disposed in a stray magnetic field.

Referring to the structure illustrated in Figure 1, the electromagnetic transducer head shown therein includes a core 10 and a pair of signal coils 11 and 12 mounted on opposite legs of the core. The core 10 includes a base portion 13 and two inverted L-shaped members 14 and 15, the short legs of the L-shaped members 14 and 15 being turned toward each other, and forming a relatively small non-magnetic gap 16 across which a magnetic record member is arranged to pass.

The two coils 11 and 12 are wound in opposite directions and connected in series by a conductor 17, the opposite ends of the coils being connected through a pair of conductors 19 and 20 to an amplifier (not shown) of the magnetic recording assembly.

Theoretically, the arrangement of the coils on the head in this manner would balance out hum due to stray fields. Due to the fact that any external fields will thread the coils 11 and 12 in the same direction, the induced voltages produced by the stray fields will be in opposition to each other and hence, by using similar coils wound in opposite directions, the hum voltages should cancel out if the magnetic circuit is adjusted properly. This is not the case in practice, however, due to the fact that stray fields are not usually uniform, but frequently have portions which are stronger in the vicinity of one coil than in the vicinity of the other coil. Under such circumstances, the hum voltage induced in one coil will not be the same as that induced in another coil, so that the hum is not cancelled out. For example, the external field threading the left hand coil 11 may be more dense than that threading the right hand coil 12. The induced voltage in the coil 11, due to this stray field, will therefore be stronger than that induced in the coil 12 and the two voltages will not balance out. To compensate for this variation, an additional ferromagnetic member 22 is positioned outside of the coil 11 and in the more dense stray field, in inductive relationship to the coil 11. The member 22 is movably secured as by means of a pin 23 to a non-magnetic support arm 24 carried by the core 10. The addition of this ferromagnetic material exteriorly of the coil which lies in the more dense magnetic field has the effect of bypassing some of the flux of the stray field, thereby weakening the field of the coil with which the ferromagnetic member is associated, without affecting substantially the predominating magnetic field in the core.

The action of the extraneous magnetic member in compensating for stray fields may be explained by the fact that the presence of the extraneous magnetic member reorients the stray magnetic field in a direction effectively at right angles to the magnetic axis of the electromagnetic transducer head. By the "magnetic axis of the head" I mean the direction of a uniform alternating magnetic field which produces a maximum induced voltage in the coil associated with the head. The magnetic axis of the head does not necessarily coincide with the axis of the coil, and this is particularly true where the ferromagnetic core of the head is relatively large. This concept is best illustrated in the diagrammatic showings of Figures 2 and 3 which illustrate the effect of a stray magnetic field on a single coil transducer head with and without the compensating device of the present invention.

In Figure 2, reference numeral 30 denotes generally a ferromagnetic core having opposed pole portions defining a non-magnetic gap 31 therebetween. Mounted on the base of the core is a coil 32, the leads of the coil being identified at 33 and 34. The dashed lines of Figure 2 represent the flux lines of a stray alternating magnetic field F which intercept the electromagnetic head at an angle other than a right angle to the magnetic axis of the head. Under these conditions, a very definite hum due to voltages induced by the stray field will be discernible in reproducing intelligence from a magnetic record member.

Figure 3:
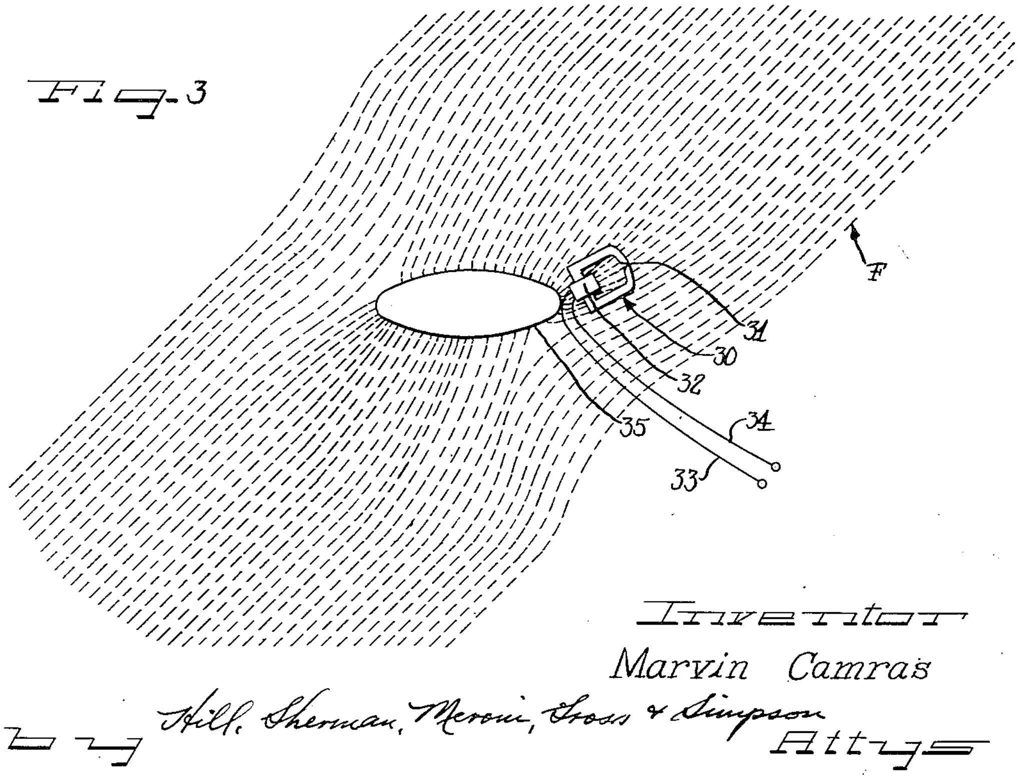
Figure 3 is a view similar to Figure 2, and illustrating the change in the magnetic flux pattern after the addition of the compensating device of the present invention.

Figure 3 illustrates the change in the configuration of the flux pattern F when the additional ferromagnetic piece is properly aligned to reorient the magnetic lines passing through the electromagnetic head. In the illustrated embodiment, a relatively massive magnetic member 35 is carried by the core structure in an angularly adjustable position outside of the coil 32 and in the stray magnetic field. The presence of the additional ferromagnetic material within the stray field reorients the magnetic lines so that they intercept the coil in a direction substantially at right angles to the magnetic axis of the head. As seen in Figure 3, the magnetic lines in the immediate vicinity of the ferromagnetic compensating member 35 intercept the magnetic member 35 in a direction substantially at right angles to the periphery thereof. If the compensating member 35 is in its proper angular disposition with respect to the electromagnetic head, the magnetic lines passing through the coil 32 will be substantially at right angles to the magnetic axis of the head, so that the stray magnetic field induces no voltage in the ferromagneic core 30 and hence, no hum appears.

Since the electromagnetic head may be placed in an assembly where the direction and magnitude of stray magnetic fields varies, it is desirable that the ferromagnetic compensating member 35 be movable with respect to the electromagnetic head in at least two directions. The specific means for accomplishing this mounting form no part of the invention, but it will be appreciated that the compensating member 35 can be movably supported on a non-magnetic support arm carried by the electromagnetic head in the manner illustrated in Figure 1, or it can be provided with an axis of rotation outside the head structure, or by any other suitable means for permitting adjustment of the position of the compensating member 35 with respect to the head.

While the drawing of Figure 3 specifically illustrates the action of the compensating device in a homogeneous stray field, the compensating device operates in the same manner in a non-homogeneous field to reorient the magnetic field into a position where a minimum amount of hum is produced in the coil.

This application is a continuation-in-part of my copending application, Serial No. 787,523, entitled, "Compensating Device for a Magnetic Recording-Reproducing Head," filed November 22, 1947 now U. S. Patent No. 2,584,984 issued February 12, 1952.

While I have shown preferred embodiments of my invention it will, of course, be understood that various details and modifications may be effected without departing from the scope of the novel concepts of the present invention.

I claim as my invention:

1. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a magnetic member mounted outside said coil in said extraneous magnetic field, said magnetic member being positioned with respect to said head to reorient said extraneous magnetic field into a direction effectively at right angles to the magnetic axis of said head.

2. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a magnetic member carried by said head in an adjustable position outside said coil in said extraneous magnetic field, said magnetic member being positioned with respect to said head to reorient said extraneous magnetic field in a direction effectively at right angles to the magnetic axis of said head.

3. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a non-magnetic spacer carried by said head, and a magnetic member secured to said spacer outside said coil in said extraneous magnetic field, said magnetic member being positioned with respect to said head to reorient said extraneous magnetic field into a direction effectively at right angles to the magnetic axis of said head.

4. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a non-magnetic spacer carried by said head, and a magnetic member secured to said spacer outside said coil in an angularly adjustable position in said extraneous magnetic field, said magnetic member being positioned with respect to said head to reorient said extraneous magnetic field into a direction effectively at right angles to the magnetic axis of said head.

5. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a non-magnetic spacer carried by said head, and a magnetic member movably secured to said spacer outside said coil in said extraneous magnetic field, said magnetic member being positioned with respect to said head to reorient said extraneous magnetic field in a direction effectively at right angles to the magnetic axis of said head.

6. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a magnetic member size of at least approximately one-tenth the size of said head, and means mounting said magnetic member, said mounting means being adjustable in at least two directions generally in the major plane of said head, said member having at least a portion thereof lying in the region between two planes at right angles to the magnetic axis of the head, each plane intersecting the head at one end of the coil, and said member being substantially spaced from any non-magnetic gaps of the head.

7. In an electromagnetic transducer head assembly including an electromagnetic head comprising a core of magnetic material in the form of a loop having a pair of spaced confronting pole portions and a coil mounted on said core, the improvement which comprises a magnetic member mounted outside said coil and outside said core and substantially spaced from any and all gaps in said core, said member being size of at least approximately one tenth the size of said head, and means mounting said magnetic member adjacent said head, but in spaced relation to said core said mounting means accommodating adjustment of said member in at least two directions generally in the major plane of said head.

8. An electromagnetic transducer head assembly comprising a core of magnetic material having a pair of spaced pole portions defining a non-magnetic gap, a pair of coils one on each of said pole portions, and a member of magnetic material positioned in substantially closer inductive relationhip to one of said coils than to the other of said coils and defining a shunt magnetic circuit by passing at least a portion of said one coil for varying the stray field linking said one coil without affecting substantially the stray field linking said other coil.

9. In an electromagnetic transducer head assembly, the combination with an electromagnetic head of a member of magnetic material, and adjustable mounting means positioning said member adjacent said electromagnetic head but substantially spaced from any and all gaps of said head and accommodating adjustment of said member in at least two directions generally parallel to the major plane of said head, said member being orientable by means of said adjustable mounting means to substantially neutralize the effect of a stray field on said head.

10. In an electromagnetic transducer head assembly, the combination with an electromagnetic head of a rigid member of magnetic material, and adjustable mounting means carrying said member and mounting said member for bodily displacement toward and away from said head, said member being positioned by said mounting means in substantially spaced relation to any and all gaps of said head.

11. In an electromagnetic transducer head assembly, the combination with an electromagnetic head of a member of magnetic material and adjustable mounting means carrying said magnetic member and positioning said member adjacent said electromagnetic head and affording said member at least three degrees of freedom including translation in each of two opposite directions and rotation on an axis provided by said mounting means, said member being orientable by means of said adjustable mounting means to substantially neutralize the effect of a stray field on said head.

12. An electromagnetic transducer head assembly comprising a core of magnetic material having a pair of spaced pole portions defining a non-magnetic gap, a pair of coils one on each of said pole portions, a member of magnetic material, and adjustable mounting means positioning said member adjacent to said core in closer relation to one of said coils than to the other of said coils and accommodating displacement of said member toward and away from said one coil for varying the effective magnetic field in that coil without affecting substantially the magnetic field in the other coil on said core, said member being positioned by said mounting means to laterally overlie at least a portion of said one coil to define a shunt magnetic circuit bypassing at least said portion of said one coil.

13. An electromagnetic transducer head assembly comprising an electromagnetic head having a core of magnetic material with a pair of spaced pole portions defining a non-magnetic gap, a coil on each of said pole portions, said coils being wound and electrically connected to be in series aiding relation with respect to a flux path including said pole portions and said non-magnetic gap, a member of magnetic material, and adjustable mounting means carrying said member for disposition adjacent to said core and in closer relation to one of said coils than to the other of said coils, said mounting means affording bodily displacement of said member toward and away from said one coil to substantially neutralize the effect of a stray field on said head.

14. An electromagnetic transducer head assembly comprising an electromagnetic head having a core of magnetic material with a pair of spaced pole portions defining a non-magnetic gap, a pair of coils one on each of said pole portions and defining spaced generally parallel magnetic axes, a member of magnetic material, and adjustable mounting means carrying said member for positioning adjacent to said core in closer relation to one of said coils than to the other of said coils, said adjustable mounting means affording said member at least three degrees of freedom including translation toward and away from said one coil and rotation about an axis provided by said mounting means, said member being orientable by means of said adjustable mounting means to substantially neutralize the effect of a stray field on said head.

15. In an electromagnetic transducer head assembly, the combination with an electromagnetic head having a core of magnetic material including a pair of spaced pole portions defining a non-magnetic gap and one and only one pick-up coil linking the magnetic path including said spaced pole portions and said non-magnetic gap, of a magnetic member disposed adjacent said core, and mounting means for said magnetic member accommodating movement of said member toward and away from said head and rotation of said member relative to said head.

16. In an electromagnetic transducer head assembly, the combination with an electromagnetic head having a core of magnetic material defining a magnetic circuit including a pair of spaced pole portions and a non-magnetic gap therebetween and having one and only one pick-up coil linking said magnetic circuit, of a magnetic member of relatively large mass in comparision with said core disposed adjacent said core, and mounting means accommodating movement of said member in at least two directions generally parallel to the major plane of said head.

17. In an electromagnetic transducer head assembly, the combination with an electromagnetic head having a core of magnetic material providing a magnetic circuit including a pair of spaced pole portions and a non-magnetic gap therebetween and having coil means linking said magnetic circuit with substantially all of the conductive pick-up windings of said coil means wound and disposed to have substantially one and only one magnetic axis, of a magnetic member of magnitude of the order of the magnitude of said core disposed adjacent said core, and mounting means for said magnetic member affording movement of said member in at least two directions generally parallel to the major plane of the head.

18. In an electromagnetic transducer head assembly in which an electromagnetic head comprising a core of magnetic material having a pair of spaced pole portions defining a non-magnetic gap and a coil mounted on said core are in an extraneous magnetic field at an angle other than a right angle to the magnetic axis of said coil the improvement which comprises a magnetic member disposed outside said coil and outside of the influence of any magnetic fields existing at gaps in said core so as not to materially affect the reluctances of said gaps, said member being disposed in said extraneous field and having a mass and orientation to re-orient said extraneous field at said coil to a direction substantially at right angles to the magnetic axis of said coil.

19. In an electromagnetic transducer head assembly, a transducer head comprising a core of magnetic material having a pair of spaced pole portions defining a non-magnetic gap and a pair of coils one on each of said pole portions, a member of magnetic material, and adjustable mounting means positioning said member adjacent to said core in closer relation to one of said coils than to the other of said coils and affording bodily displacement of said member toward and away from said one coil, said adjustable mounting means including threaded clamping means for securing said member in a position to substantially neutralize the effect of a stray magnetic field on said head.

20. An electromagnetic transducer head assembly comprising an electromagnetic head having a generally C-shaped core including a base leg and symmetrically arranged pole portions connected to spaced points on said base leg and terminating in spaced relation to define a non-magnetic gap, a coil on said base leg, a magnetic member disposed adjacent said core, and adjustable mounting means for said magnetic member accommodating universal movement of said member generally parallel to the major plane of said head.

21. An electromagnetic transducer head assembly comprising an electromagnetic head having a generally C-shaped core including a base leg and symmetrically arranged pole portions connected to spaced points on said base leg and terminating in spaced relation to define a non-magnetic gap, a coil on said base leg, a magnetic member disposed adjacent said core, and adjustable mounting means for said magnetic member accommodating universal movement of said member generally parallel to the major plane of said head, said member being of elongated configuration and having its major axis disposed generally at right angles to the magnetic axis of said head with one end of said member in proximity to said coil.

22. In an electromagnetic transducer head assembly in which an electromagnetic head comprising a core of magnetic material having a pair of spaced confronting pole portions and a coil mounted on said core are in an extraneous magnetic field at an angle other than a right angle to the magnetic axis of said head, the improvement which comprises a magnetic member mounted outside said coil in said extraneous magnetic field, said magnetic member being of size and orientation with respect to said head to re-orient said extraneous magnetic field into a direction effectively at right angles to the magnetic axis of said head, and said member having a size several times the size of said core.

References Cited in the file of this patent

UNITED STATES PATENTS

| | | |
|---|---|---|
| 2,416,082 | Balmer | Feb. 18, 1947 |
| 2,483,123 | Clapp | Sept. 27, 1949 |
| 2,504,778 | Young | Apr. 18, 1950 |
| 2,584,984 | Camras | Feb. 12, 1952 |